E. MURRAY.
PNEUMATIC COTTON PICKER.
APPLICATION FILED FEB. 17, 1908.
1,024,455.
Patented Apr. 23, 1912.
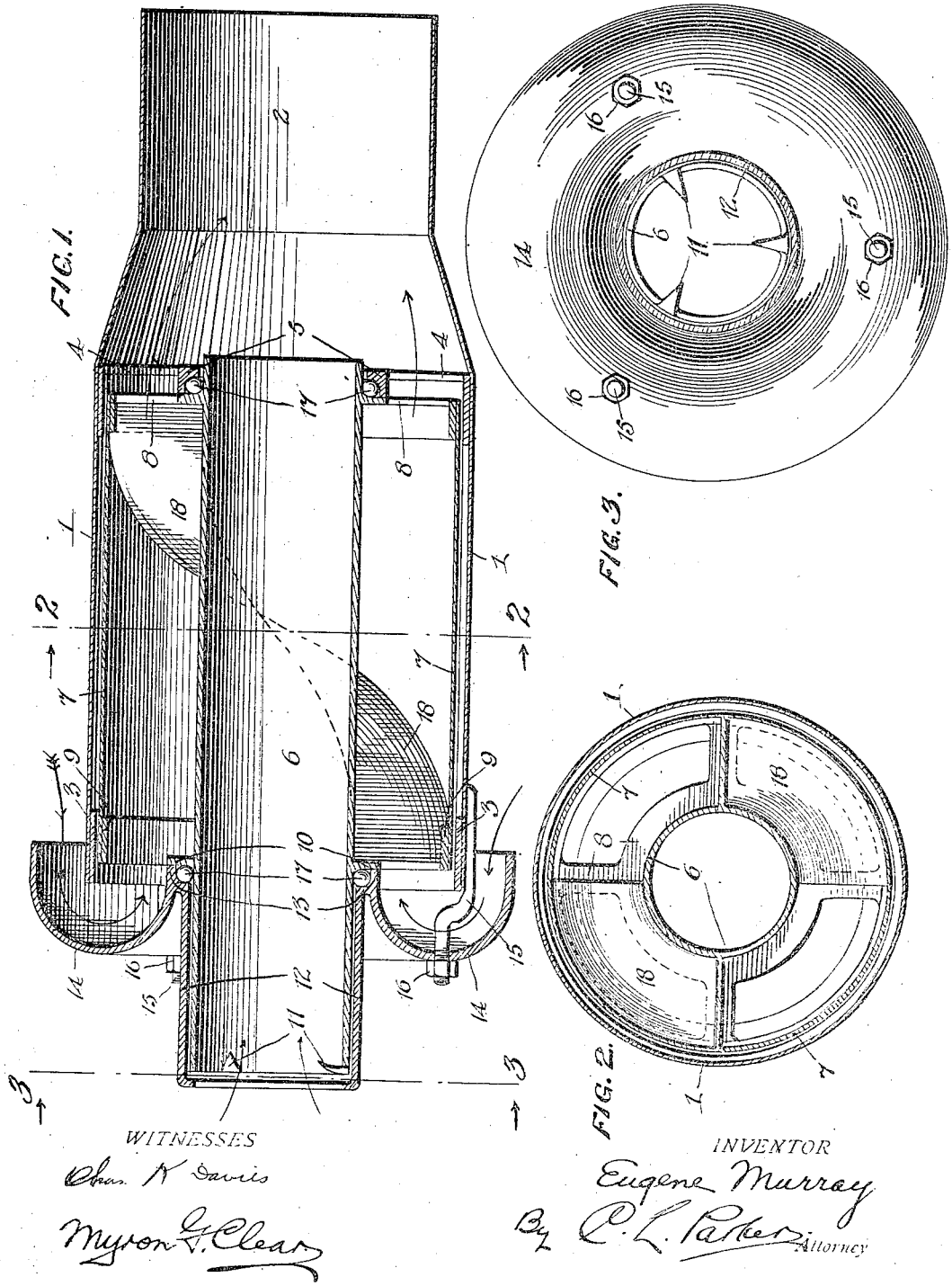
WITNESSES
INVENTOR
Eugene Murray
By C. L. Parker, Attorney

UNITED STATES PATENT OFFICE.

EUGENE MURRAY, OF WASHINGTON, DISTRICT OF COLUMBIA, ASSIGNOR TO LLEWELLYN JORDAN, OF PORT GIBSON, MISSISSIPPI.

PNEUMATIC COTTON-PICKER.

1,024,455.  Specification of Letters Patent.  Patented Apr. 23, 1912.

Application filed February 17, 1908. Serial No. 416,354.

*To all whom it may concern:*

Be it known that I, EUGENE MURRAY, a citizen of the United States, residing at Washington, in the District of Columbia, have invented certain new and useful Improvements in Pneumatic Cotton-Pickers, of which the following is a specification.

My invention relates to cotton pickers and more especially to that class of cotton pickers employing air as the operating medium, and the object thereof is to provide a novel construction which will be simple and inexpensive to manufacture and efficient and durable in use.

A further object of my invention is to provide mechanical picking elements operated by the air, in combination with means to prevent the contact of the cotton, before or after the picking thereof, from contact with the operating means.

With these and other objects in view, my invention specifically resides in the following features of construction, combination, arrangement and operation to be hereinafter described with reference to the accompanying drawing, forming a part of this specification, in which like numerals are used to designate like parts throughout the several figures, and in which, Figure 1 is a longitudinal sectional view of a picking head constructed in accordance with my invention, Fig. 2 is a cross sectional view taken therethrough on the line 2—2 of Fig. 1, and Fig. 3 is a similar view taken therethrough on the line 3—3 of Fig. 1.

In the practical embodiment of my invention I provide a picking head comprising an outer stationary cylindrical casing 1 open at its outer end and provided with a reduced inner end 2 adapted to receive one end of an air hose attached at its other end to an exhausting fan or the like for sucking the air in through said head and said hose. The outer open end of said casing is preferably strengthened by an internal supporting ring 3.

Within the casing 1 and adjacent its point of reduction to form the end 2 is a spider 4 having a central annulus 5 surrounding and supporting the inner extending end of the picking tube 6. The picking tube 6 is of greatly reduced diameter in comparison to the outer casing 1 and is concentrically mounted therein. Mounted about the picking tube 6 and of slightly reduced diameter in comparison to the outer casing 1 is a tubular picker casing 7 concentric with said outer casing and said picking tube and connected at its inner end to the latter tube by a spider frame 8, the outer end of said picker casing extending to within a short distance of the outer end of the casing 1 and being similarly strengthened by an internal ring 9.

The picking tube 6 is provided with an outstanding circular flange 10 intermediate its ends and extends outwardly beyond the end of the casing 1, being provided at its outer end with picking fingers 11 extending inwardly and curved from the edge thereof. A protecting tube 12 surrounds the outer end of said picking tube 6 beyond the ends of the casings 1 and 7, and is provided with an offset flange 13 abutting the flange 10 of the picking tube and with a circular curved outstanding flange 14 covering the mouths of the casings 1 and 7 in spaced relation, to allow of the entrance of air, and secured to the outer casing 1 by brackets in the form of bolt bars 15 connected to and extending from said casing 1 and passing through the said flange, said bars being threaded for the reception of nuts 16 upon the outer face of said flange. The abutting flanges 10 and 13 of the picking tube 6 and the protecting tube 12 respectively and the annulus 5 and the portions of said picking tube adjacent the same are formed to receive balls 17 therebetween to allow of free rotation of the picking tube 6 and its casing 7. Such rotation is effected by means of oppositely disposed and spirally curved vanes 18 disposed between said tube 6 and its casing 7 and acted upon by the air drawn through the open end of said casing 7 which is protected from the entrance of any of the cotton by the curved covering flange 14.

In operation, the air hose having been attached to the reduced end 2 of the stationary casing 1, the end of the picking tube 6 is guided by the operator upon the cotton boll which is torn from its pod by the revolving fingers 11 and is sucked through the tube 6 and through the hose without coming into contact with any of the operating parts.

Such a construction as I have shown will be simple and inexpensive to manufacture, will be highly efficient and lasting in use and will render the operation of picking cotton much easier and quicker than has heretofore been accomplished, with a minimum loss of cotton.

Having thus described my invention what I claim as new and desire to secure by Letters Patent is:

1. A nozzle for pneumatic cotton picking apparatus comprising a revolving cylinder and a revolving picking tube.

2. A nozzle for pneumatic cotton picking apparatus comprising a casing, a revolving cylinder within said casing, a picking tube, and means for revolving said cylinder and said tube.

3. A nozzle for pneumatic cotton picking apparatus, comprising a casing, a revolving cylinder within said casing, a picking tube, and blades secured to said cylinder for revolving the same and said tube.

4. A nozzle for pneumatic cotton picking apparatus comprising a casing having air inlets, a cylinder revolubly mounted in said casing, a picking tube, and means operated by the air suction to revolve the cylinder and picking tube.

5. The combination in a device of the character described, of a rotatable picking tube, and picking fingers extending inwardly and curved rearwardly from the forward end thereof, and means for causing a current of air therethrough.

6. The combination in a device of the character described, of a rotatable picking tube, having integral picking fingers extending inwardly, and curved rearwardly, from the forward end thereof, and means for causing a current of air therethrough.

7. The combination in a device of the character described, of a rotatable picking tube, having picking fingers extending inwardly and curved rearwardly from the forward end thereof, means for causing a current of air therethrough and means outside of said tube for rotating the same, substantially as described.

8. The combination in a device of the character described, of a rotatable picking tube, having integral picking fingers extending inwardly and curved rearwardly from the forward end thereof, and means for causing a current of air therethrough and means outside of said tube for rotating the same, substantially as described.

9. The combination in a device of the character described, of a rotatable picking tube having picking fingers extending inwardly and curved rearwardly from the forward end thereof, substantially as described.

10. The combination in a device of the character described, of a rotatable picking tube having integral picking fingers extending inwardly and curved rearwardly from the forward end thereof, substantially as described.

11. The combination in a device of the character described, of a casing, a picking tube rotatably mounted within said casing and provided with picking fingers extending inwardly from the end thereof, and means between said tube and said casing for rotating said tube, substantially as described.

12. The combination in a device of the character described, of a casing, a picking tube rotatably mounted within said casing and provided with integral picking fingers extending inwardly from the end thereof, and means between said tube and said casing for rotating said tube, substantially as described.

13. The combination in a device of the character described, of a casing, a picking tube rotatably mounted therein and provided with picking fingers extending inwardly and curved rearwardly from the forward end thereof, and means between said tube and said casing for rotating said tube, substantially as described.

14. The combination in a device of the character described, of a casing, a picking tube rotatably mounted within said casing and provided with integral picking fingers extending inwardly toward its axis and curved rearwardly from the forward end thereof, and means between said tube and said casing for rotating said tube, substantially as described.

15. The combination in a device of the character described, of a casing, a picking member provided with internal picking elements, means for causing a current of air through said casing and said member, and means between said member and said casing operated by the said air current to rotate said member, said last named means being prevented from contact with the said elements and the material picked, substantially as described.

16. The combination in a device of the character described, of a casing, a hollow picking tube rotatably mounted within said casing and provided with internal picking fingers, means for causing a current of air through said casing and said tube, and means between said tube and said casing and operated by the said air surrent for rotating said tube, substantially as described.

17. The combination in a device of the character described, of a casing, a picking member rotatably mounted therein and provided with internal picking elements, means for causing a current of air through said casing and said member, means between said member and said casing and operated by the said air current to rotate said member, said last named means being prevented from contact with said elements and the material picked, and means carried by said casing for shielding its air intake, substantially as described.

18. The combination in a device of the character described, of a casing, a picking tube rotatably mounted within said casing and provided with picking fingers, means for causing a current of air through said casing and said tube, means between said tube and said casing and operated by the air current to rotate said tube, and means shielding the mouth of said casing, substantially as described.

19. The combination in a device of the character described, of a casing, a picking tube rotatably mounted therein and concentric therewith, and means for causing a current of air through said casing and said tube, of a plurality of picking fingers carried by said picking tube through which the material passes, means between said tube and said casing and operated by the air current to rotate said tube, and a shield encircling said tube adjacent the mouth of said casing, substantially as described.

20. The combination in a device of the character described, of a casing, a picking tube rotatably concentrically mounted therein, said casing and said tube being open at their ends to allow air to be drawn therethrough, picking fingers carried by said tube adjacent the mouth thereof, means between said tube and said casing and operated by the indrawn air to rotate said tube, and a shield encircling said tube adjacent the mouth of said casing, said shield being secured to said casing and having a tubular portion extending about said picking tube at its forward end, substantially as described.

21. The combination in a device of the character described, of a rotatable picking tube having picking fingers extending inwardly and curved rearwardly from the forward end thereof, and means outside of said tube for rotating the same, substantially as described.

22. A nozzle for pneumatic cotton picking apparatus comprising a casing having air inlets, a rotatable picking tube or cylinder arranged within the casing, means adapted to be operated by air and carried by the tube or cylinder for revolving the latter, and means for creating a current of air through the tube or cylinder.

23. A nozzle for pneumatic cotton picking apparatus comprising a casing, a rotatable picking tube or cylinder arranged within said casing, means for creating a current of air through said casing and cylinder or tube, and means for revolving the tube or cylinder, said means being arranged in the path of the air current through the casing and operated thereby.

In testimony whereof I affix my signature in presence of two witnesses.

EUGENE MURRAY.

Witnesses:
   WM. B. MURRAY,
   C. L. PARKER.